United States Patent [19]

Koenig et al.

[11] Patent Number: 5,062,321
[45] Date of Patent: Nov. 5, 1991

[54] CONTROL APPARATUS FOR REGULATING ENGAGEMENT OF A FLUID OPERATED TORQUE TRANSMITTING DEVICE

[75] Inventors: Melissa M. Koenig, Ann Arbor; William J. Vukovich, Ypsilanti, both of Mich.

[73] Assignee: General Motors Corporation, Detroit, Mich.

[21] Appl. No.: 667,141

[22] Filed: Mar. 11, 1991

[51] Int. Cl.⁵ .................................... F16H 61/06
[52] U.S. Cl. ................................................ 74/866
[58] Field of Search ........................................ 74/866

[56] References Cited

FOREIGN PATENT DOCUMENTS 59-151652  2/1984  Japan .

OTHER PUBLICATIONS

THM 700-R4 "Principles of Operation" (2nd Ed.) by Hydra-Matic of GMC.

Isuzu Technician Guide "Principles of Operation and Diagnosis" Automatic Transmission 4L30-E.

Primary Examiner—Dirk Wright
Attorney, Agent, or Firm—Mark A. Navarre

[57] ABSTRACT

An electronically mechanized control method for regulating the engagement rate or stroke time of a fluid operated torque transmitting device, wherein the flow rate is controlled through a coordinated control of the supply pressure and an on-off fluid restriction device. At the initiation of a shift involving engagement of the rate controlled torque transmitting device, an appropriate stroke time is determined in terms of a suitable combination of line pressure and fluid restriction to be commanded for the duration of the shift. The on-off fluid restriction device comprises a first orifice which always remains in the servo supply circuit and second orifice which is selectively connected in parallel with the first orifice via a solenoid operated shuttle valve.

7 Claims, 4 Drawing Sheets

CONTROL APPARATUS FOR REGULATING ENGAGEMENT OF A FLUID OPERATED TORQUE TRANSMITTING DEVICE

This invention relates to an apparatus and control method for regulating the engagement of a fluid operated automotive torque transmitting device, and more particularly, to a coordinated electronic control of supply pressure and fluid restriction.

BACKGROUND OF THE INVENTION

In motor vehicle multi-speed ratio automatic transmissions, it is often desirable to effect shifting from one speed ratio to another without the use of free-wheeling or one-way devices. This requires a coordinated timing control of both off-going and on-coming fluid operated torque transmitting devices in order to achieve a desired amount of overlap as the transmitted torque is shifted from the off-going device to the on-coming device. Typically, the off-going fluid pressure is progressively released through an orifice while fluid pressure is supplied to the on-coming device through a pressure control device such as an accumulator or a servo.

Where a control of the on-coming device engagement rate or stroke time is desired, the fluid flow at the inlet or outlet of the accumulator or servo may be separately regulated. In one known system involving a servo actuated friction band device, for example, a speed-biased regulator valve is used to vary a restriction for the fluid being displaced by the servo piston. In another similar system, an electro-hydraulic valve is pulse-width-modulated at a variable duty cycle to vary a restriction for the fluid supplied to the inlet of the servo. Unfortunately, these systems are relatively expensive to implement and often exhibit some level of supply pressure sensitivity, degrading the ability of the control to achieve the desired engagement rate or stroke time.

SUMMARY OF THE PRESENT INVENTION

The present invention is directed to an improved electronic control apparatus and method for regulating the engagement rate or stroke time of a fluid operated torque transmitting device, wherein the flow rate is controlled through a coordinated control of the supply pressure and an on-off fluid restriction device. The control is most favorably mechanized in a transmission already incorporating an electronic control of the supply or line pressure. At the initiation of a shift involving engagement of the rate controlled torque transmitting device, an appropriate stroke time is determined and a suitable combination of line pressure and fluid restriction are commanded for the duration of the shift.

In the preferred embodiment, the on-off fluid restriction device comprises a first orifice which always remains in the servo supply circuit and a second orifice which is selectively connected in parallel with the first orifice via a solenoid operated shuttle valve. The desired state of the shuttle valve is determined at the initiation of the shift, and that state is retained throughout the shift.

The state of the on-off fluid restriction device essentially selects one of two servo flow rate ranges, each such range being limited by the minimum and maximum permissible values of the transmission supply or line pressure. The controller merely initializes the restriction device to establish a flow range which can satisfy the desired stroke time of the servo, and then commands a line pressure which, when applied to the fluid restriction device, will precisely achieve the desired stroke time. The digital or on-off nature of the fluid restriction device avoids the expense of precision regulator or PWM valves, and the supply or line pressure sensitivity is drastically reduced because the line pressure is an integral part of the control.

In the illustrated embodiment, the apparatus of this invention is mechanized in connection with a wash-out type shift control arrangement substantially as set forth in U.S. Pat. No. 2,865,227 to Kelley et al., issued Dec. 23, 1958, and assigned to the assignee of the present invention. In that arrangement, the servo for an off-going band brake operates as an upshift accumulator for an on-coming friction clutch. The fluid restriction device and line pressure control of this invention operate when a subsequent clutch-to-band downshift is required by controlling the stroke time of the servo for the on-coming band brake.

DETAILED DESCRIPTION OF THE INVENTION

Figure 1:
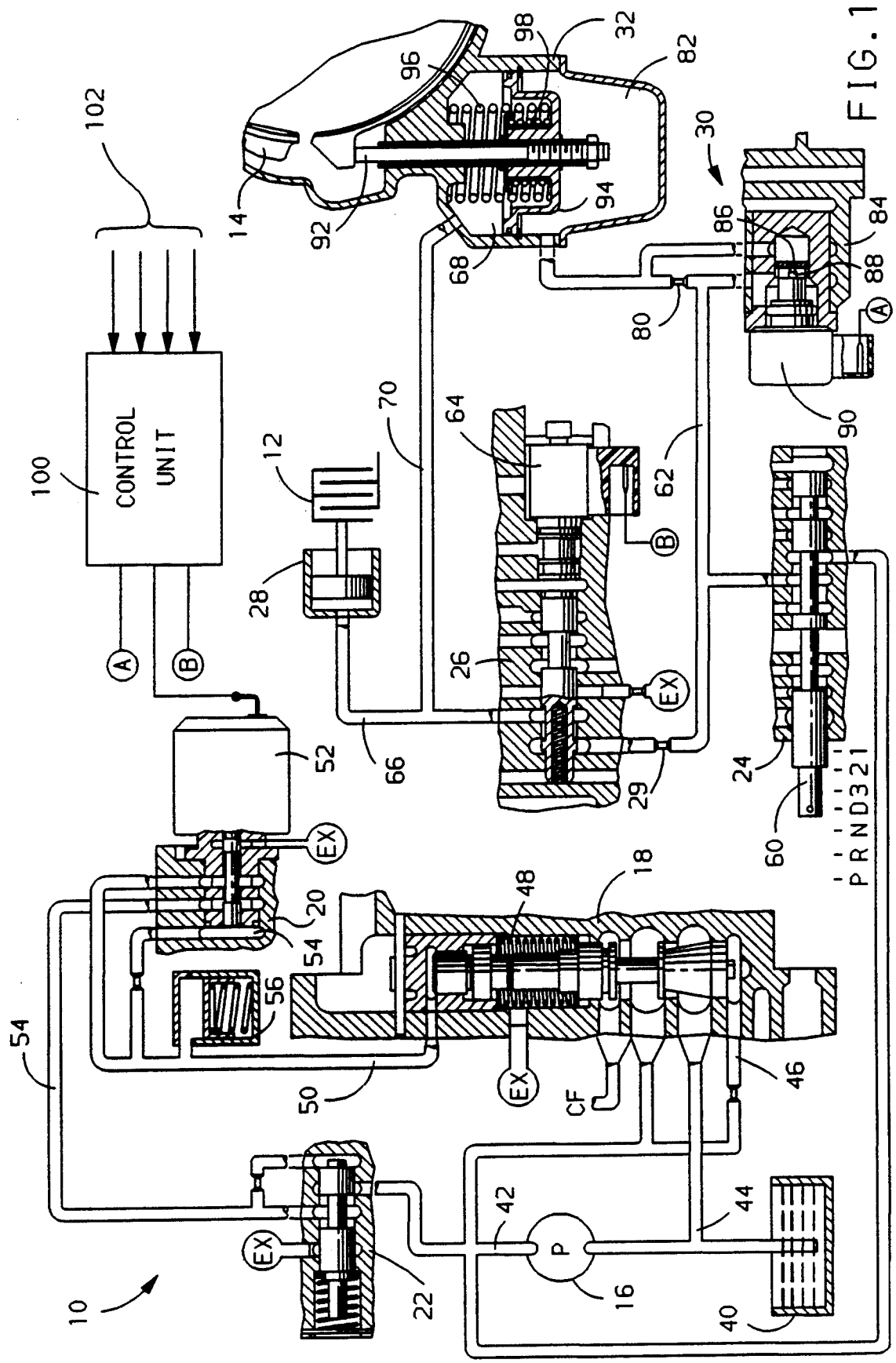
FIG. 1 depicts a control apparatus according to this invention, sectional views of various hydraulic transmission control elements and a computer-based control unit for carrying out line pressure and shift controls.

Referring particularly to FIG. 1, the reference numeral 10 generally designates an array of hydraulic transmission control elements for regulating the engagement and disengagement of friction clutch 12 and band brake 14 to effect shifting between a pair of forward transmission speed ratios. In a typical application, a 1:1 or direct ratio (3rd) is provided with engagement of the clutch 12, and an underdrive ratio (2nd) is provided with engagement of the band brake 14. Thus, a 2-3 upshift is achieved through concurrent disengagement of band brake 14 and engagement clutch 12, while a 3-2 downshift is achieved through concurrent disengagement of clutch 12 and engagement band brake 14. As explained below, this invention concerns the engagement of band brake 14 to effect a 3-2 downshift.

The illustrated hydraulic elements include a positive displacement mechanically driven hydraulic pump 16, a pressure regulator valve 18, a force motor controlled line pressure bias valve 20 and limit valve 22, an operator manipulated manual valve 24, a solenoid controlled 2-3 shift valve 26, a clutch apply servo 28, a fluid restriction circuit 30, and a band apply servo 32. The pump 16 receives hydraulic fluid at low pressure from the fluid reservoir 40, and supplies line pressure fluid to the transmission control elements via output line 42. Pressure regulator valve 18 is connected to the pump output line 42 and serves to regulate the line pressure and torque converter feed pressure (CF) by returning a controlled portion of the line pressure to reservoir 40 via the line 44.

The pressure regulator valve 18 is biased at one end by orificed line pressure in line 46 and at the other end by the combination of a spring 48 and a controlled bias pressure in line 50. The controlled bias pressure is supplied by the line pressure bias valve 20 which develops pressure in relation to the current supplied to electric force motor 52, the force motor 52 being hydraulically balanced by the pressure in bias chamber 54. Line pressure is supplied as an input to bias valve 20 via line 54 and the limit valve 22. An accumulator 56 connected to the bias pressure line 50 serves to stabilize the bias pressure.

With the above-described valving arrangement, it will be seen that the line pressure of the transmission is electrically regulated by force motor 52. In the event of an interruption of electrical power to the force motor 52, the bias pressure in line 50 assumes a maximum value, thereby forcing maximum line pressure.

The friction clutch 12 and band brake 14 are activated by conventional fluid servos 28 and 32, respectively. The servos 28 and 32, in turn, are connected to a fluid supply system comprising the Manual Valve 24, the 2-3 shift valves 26, and the fluid restriction circuit 30. The Manual Valve 24 develops a supply pressure D32 for the 2nd and 3rd forward speed ranges of the transmission in response to driver positioning of the transmission range selector lever 60. The D32 pressure, in turn, is supplied via line 62 to the shift valve 26 and fluid restriction circuit 30 for application to the servos 28 and 32.

The shift valve 26 is spring-biased against a controlled bias pressure developed by the solenoid 64, the valve 26 being illustrated in its activated state. In the illustrated state, the shift valve 26 supplies D32 supply pressure to the clutch servo 28 via line 66 and to a release chamber 68 of band brake servo 32 via line 70. In the deactivated state, the lines 66 and 70 are exhausted via exhaust port 72.

The fluid restriction circuit 30 comprises a first orifice 80 connecting the D32 supply pressure line 62 to an apply chamber 82 of band brake servo 32, and a solenoid operated shuttle valve 84 which is selectively activated to connect a second orifice in parallel with the first orifice 80, the second orifice being defined by the valve seat 86. The shuttle valve 84 includes a pintle armature 88 spring-biased into engagement with the seat 86, and a solenoid 90 which when electrically activated lifts the pintle armature 88 off the seat 86 to connect the seat orifice in parallel with the first orifice 80. Thus, supply pressure fluid is supplied to the servo inlet chamber 82 via orifice 80 alone when solenoid 90 is deactivated, and via the parallel combination of orifices 80 and 86 when solenoid 90 is activated.

The servo 32 includes a post 92 fastened to a diaphragm 94 which is axially displaceable within the servo housing. A pair of springs 96 and 98 reacting against the housing of servo 32 urge the diaphragm 94 and hence the post 92 downward, as viewed in FIG. 1, to release the band brake 14. The spring forces may be aided by fluid pressure in release chamber 68 or opposed by fluid pressure in apply chamber 82.

Reference numeral 100 designates a computer-based control unit which develops suitable electrical control signals for the force motor 52 and the solenoids 64 and 90 in response to a variety of vehicle and powertrain parameters, represented by the input lines 102. The line pressure control of force motor 52 is essentially continuous during operation of the transmission, ensuring that the developed pressure is sufficient to prevent clutch slippage during steady state operation, and providing shift quality control during shifting. The control of solenoids 64 and 90, on the other hand, pertain strictly to shifting and are discrete or on-off in nature.

In 2nd ratio operation, the shift valve solenoid 64 is deactivated so that the clutch servo 28 and the band brake servo release chamber 68 are vented through shift valve exhaust port 72. The servo apply chamber 82 is maintained at D32 supply pressure via fluid restriction circuit 30, overcoming the spring bias to extend the servo post 92 and engage the band brake 14.

When a 2-3 upshift is required, the control unit 100 activates the shift valve solenoid 64 to connect the D32 supply pressure to clutch servo 28 and the release chamber 68 of band brake servo 32 via orifice 29. This pressure balances the apply chamber pressure, allowing the springs 96 and 98 to stroke the diaphragm 94, retracting the post 92 as the apply chamber fluid is displaced through the fluid restriction circuit 30 and into the pressure control line 62. The pressure in the clutch servo 28 builds as a function of the spring rates and orifices, engaging the clutch 12 as the band brake is released. This is a conventional band-to-clutch washout upshift.

Figure 3:
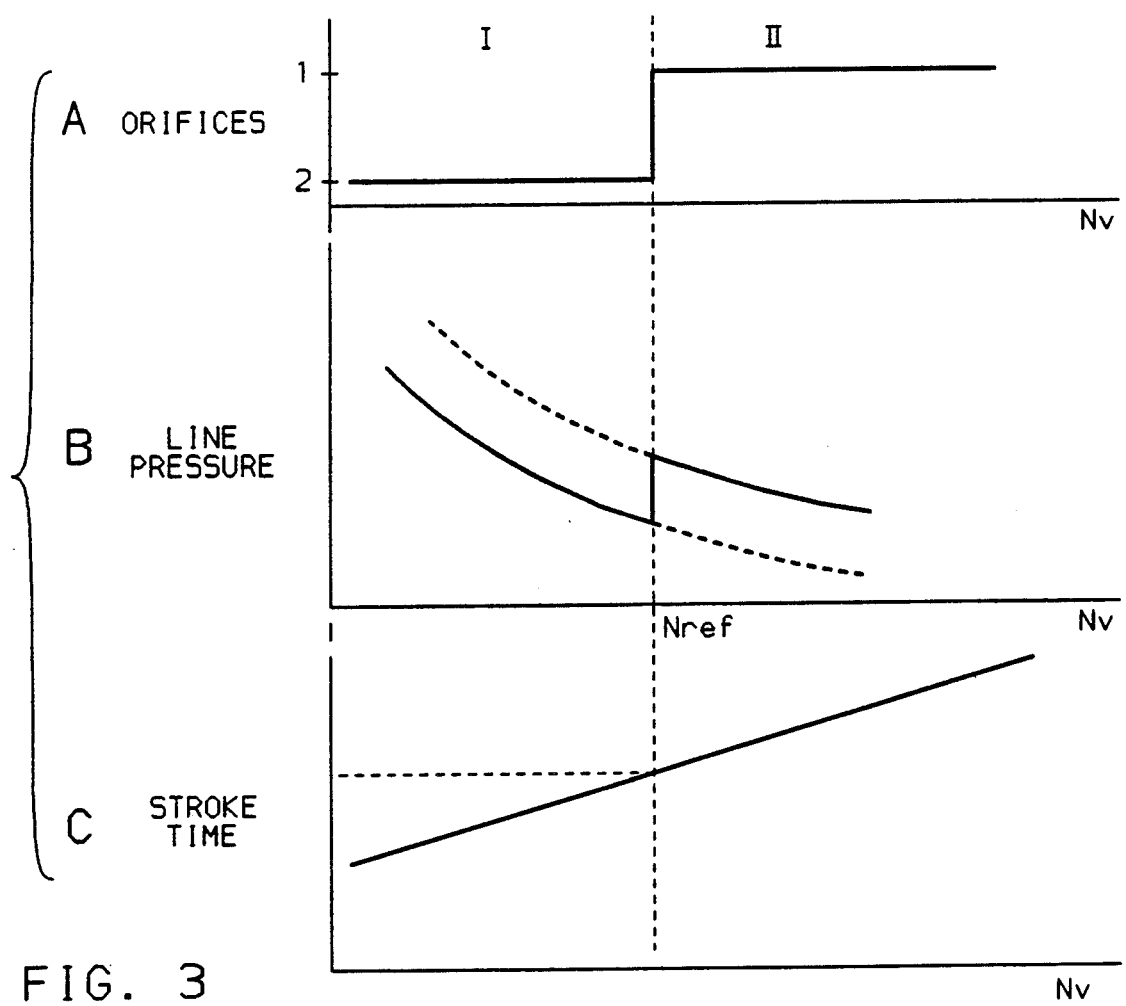
FIG. 3 graphically depicts the control method of this invention.

When a 3-2 downshift is required, the control unit 100 determines the required state of the shuttle valve solenoid 90, commands the appropriate line pressure signal to force motor 52, and deactivates the shift valve solenoid 64 to vent the fluid in clutch servo 28 and band brake servo release chamber 68. The line pressure and shuttle valve commands are based on factors described below in reference to FIG. 3. The combination of the line (D32) pressure and the effective orifice size of fluid restriction circuit 30 determines the fluid flow rate into servo apply chamber 82, which in turn, determines the stroke time of the servo post 92. Once the shift is complete, there is no flow through the fluid restriction circuit 30, and the state of the solenoid 90 is immaterial. Under such conditions, the solenoid may be deactivated to reduce power consumption and heat dissipation.

Figure 2:
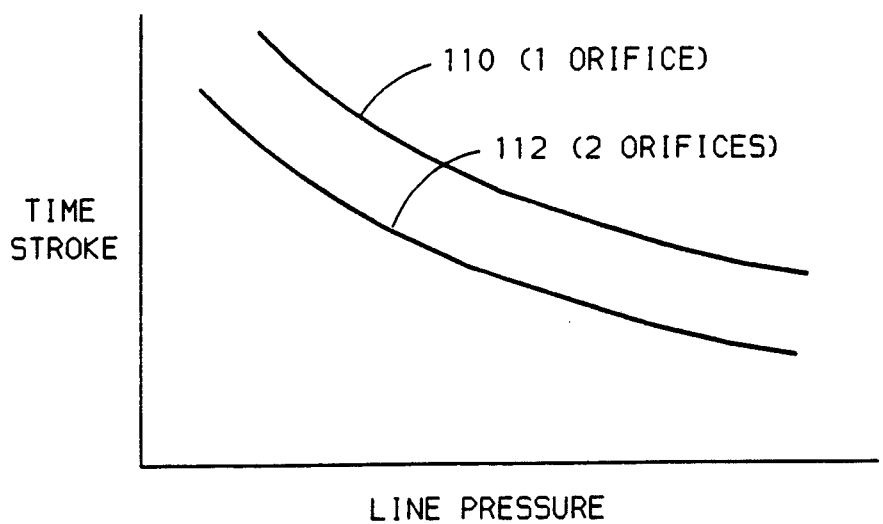
FIG. 2 graphically depicts the ranges of servo which can be achieved by each state of the on-off fluid restriction device.

The graph of FIG. 2 illustrates the relationship between the stroke time of band brake servo 32 and the transmission line pressure, with and without activation of the shuttle valve solenoid 90. When the shuttle valve solenoid 90 is deactivated and the supply pressure can only pass through orifice 80, the relationship is given by the "1 ORIFICE" trace 110. As one would expect, increasing line pressure increases the fluid flow, thereby decreasing the stroke time; similarly, decreasing line pressure decreases the fluid flow, thereby increasing the stroke time. When the shuttle valve solenoid 90 is activated and the supply pressure can pass through the valve seat orifice 86 as well as the orifice 80, the relationship is given by the "2 ORIFICE" trace 112. The parallel combination of orifices 86 and 80 permits increased flow, resulting in reduced stroke time for a given line pressure.

There are, of course, limitations on how low and high the line pressure may be adjusted without adversely affecting other transmission controls. For example, the line pressure should not be reduced to a value which would permit unwanted slippage of another friction element, as this would likely degrade the shift quality.

In view of the above, it is unlikely that the desired range of stroke times could be achieved by line pressure control alone. However, the use of the shuttle valve 84 in combination with a limited line pressure control produces a desired range of stroke times. Such a control is graphically depicted in FIG. 3, where Graph 3 depicts the desired stroke time as a function of vehicle speed Nv, and Graphs A and B respectively depict the appropriate fluid restriction and line pressure controls.

Essentially, the two states of shuttle valve 84 divide the range of desired stroke time into a lower, two orifice range (I), in which the solenoid 90 is activated, and an upper, one orifice range (II), in which the solenoid 90 is deactivated. Since the stroke time is determined as a function of vehicle speed Nv, the control unit 100 may also determine the shuttle valve solenoid state as a function of vehicle speed. For vehicle speeds less than or equal to the reference speed Nref, the solenoid 90 is activated; for vehicle speeds greater than the reference speed, the solenoid 90 is deactivated. The required line pressure may similarly be determined as a function of vehicle speed, employing a look-up table storing the information represented in Graph B.

Figure 4:
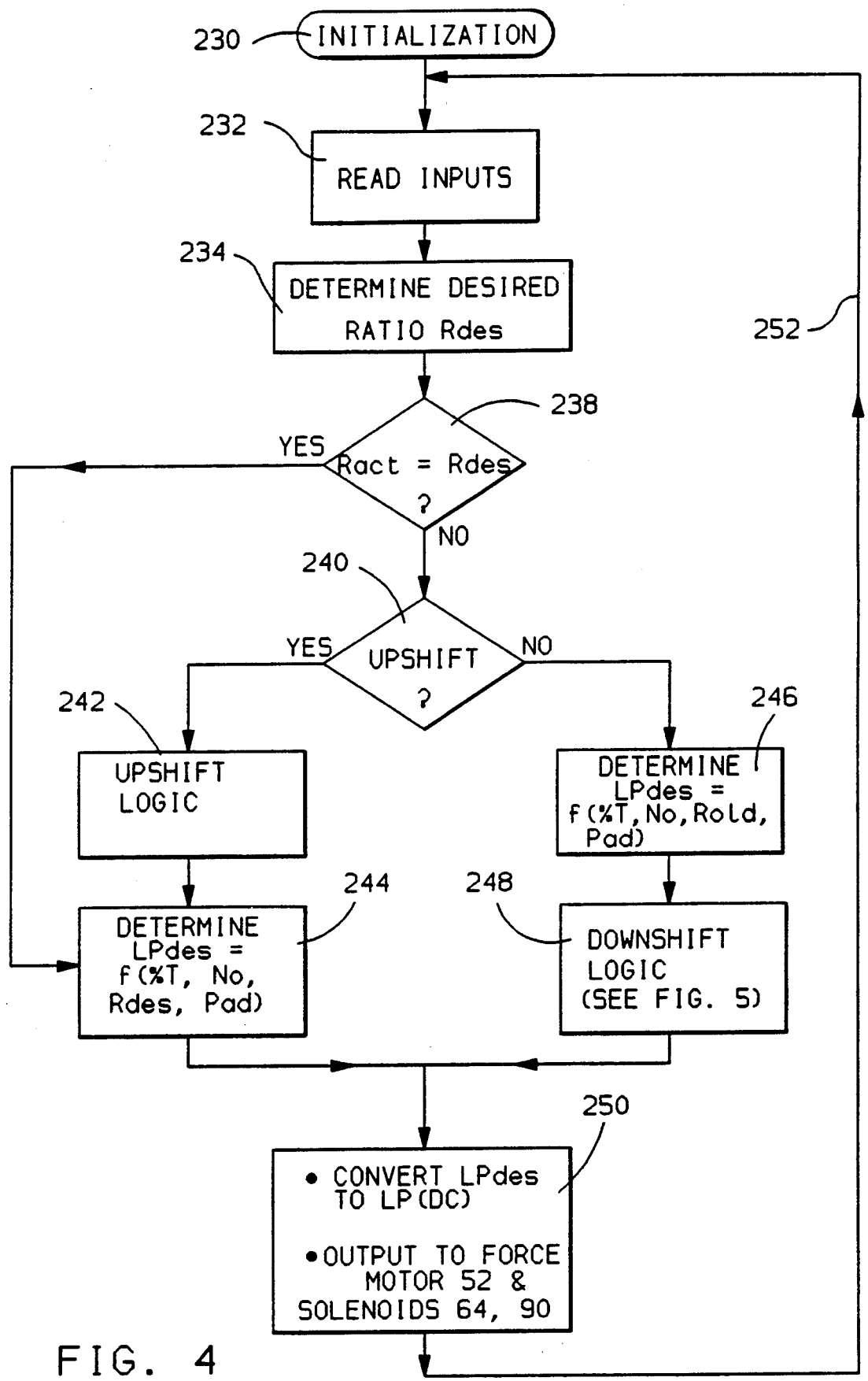
FIGS. 4 and 5 depict flow diagrams representative of computer program instructions executed by the computer-based control unit of FIG. 1 in carrying out the control of this invention.
Figure 5:
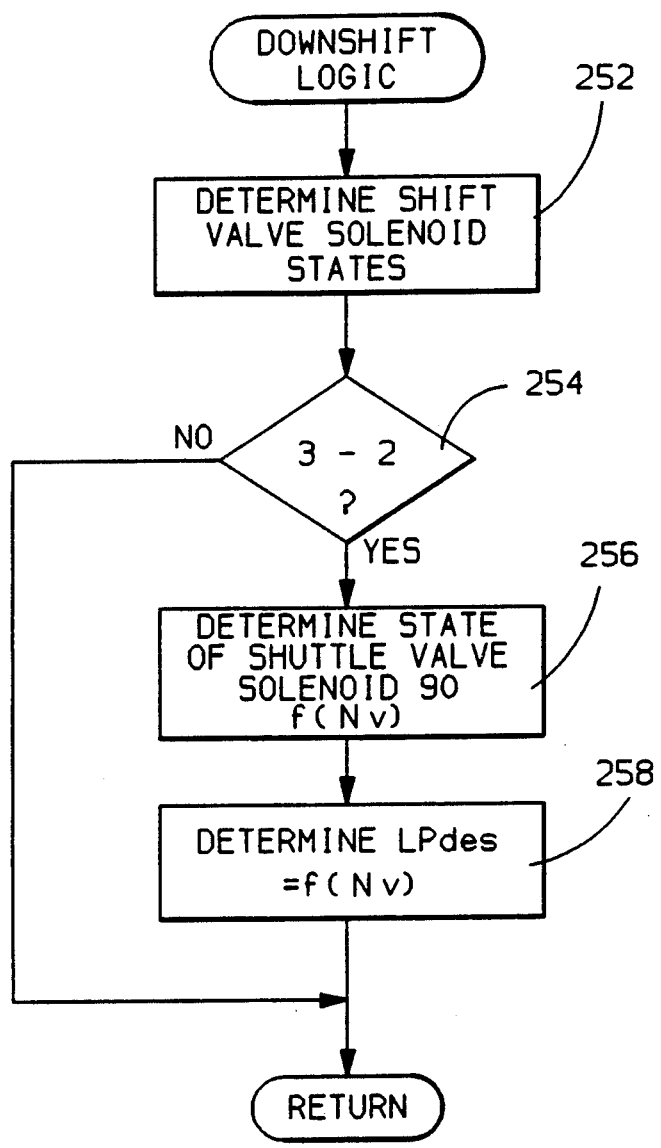

Flow diagrams, representative of computer program instructions for carrying out the control of this invention with the apparatus depicted in FIG. 1, are depicted in FIGS. 4 and 5. The flow diagram of FIG. 4 represents a main or executive computer program which is periodically executed in the course of vehicle operation in carrying out the control of this invention. The block 230 designates a series of program instructions executed at the initiation of each period of vehicle operation for setting various terms and timer values to an initial condition. Thereafter, the blocks 232–234 are executed to read the various inputs referenced in FIG. 1 and to determine the desired speed ratio Rdes. The desired ratio Rdes may be determined in a conventional manner as a predefined function of engine throttle position and output vehicle speed Nv.

If the actual ratio Ract — that is, Ni/No — is equal to the desired ratio Rdes, as determined at block 238, the block 244 is executed to determine the desired line pressure LPdes. In this case, the desired line pressure LPdes is determined as a function of throttle position and output speed, and also is adjusted based on the desired ratio Rdes and an adaptive correction term Pad. The adaptive correction term Pad may be generated during upshifting, based on shift time, as set forth in U.S. Pat. No. 4,283,970 to Vukovich et al. issued Aug. 18, 1981, and assigned to the assignee of this invention.

If an upshift is required, as determined by blocks 238 and 240, the blocks 242 and 244 are executed to perform suitable Upshift Logic in addition to determining the desired line pressure LPdes as described above. If a downshift is required, as determined by blocks 238 and 240, the blocks 246 and 248 are executed to determine the desired line pressure LPdes and to perform the Downshift Logic. Normally, the desired line pressure is determined as a function of throttle position, output speed, the pre-shift or old ratio Rold, and the adaptive correction term Pad, as indicated at block 246, but is modified by the Downshift Logic block 248 if the shift is a 3–2 downshift. As indicated at block 248, the Downshift Logic is set forth in further detail in the flow diagram of FIG. 5. In any case, the block 250 is then executed to convert the desired line pressure LPdes to a solenoid duty cycle LP(DC), to output the duty cycle LP(DC) to force motor 52, and to output discrete solenoid states to the solenoids 64 and 90.

Referring now to the Downshift Logic flow diagram of FIG. 5, the block 252 is first executed to determine the required states of the various shift valve solenoids. As indicated above, the present invention concerns the 2–3 shift valve solenoid 64, which is activated to initiate a 2–3 upshift and deactivated to initiate a 3–2 downshift. If the shift is a 3–2 downshift, as detected at block 254, the blocks 256 and 258 are executed to determine the required state of shuttle valve solenoid 90 and the desired line pressure LPdes, both as a function of the vehicle speed Nv as described above in reference to FIG. 3.

Regarding the shuttle valve 84, the activated state of solenoid 90 is selected if the vehicle speed Nv is less than or equal to the speed reference Nref, while the deactivated state is selected if the vehicle speed is greater than Nref. The desired line pressure, on the other hand, is determined from a look-up table representing the data depicted in Graph B of FIG. 3. As explained above, the combination of the selected shuttle valve state and the desired line pressure cooperate to produce the desired stroke time of the band brake servo 32.

While illustrated in reference to a wash-out shift arrangement, it will be appreciated that the engagement rate control of the present invention will find application in the engagement of any torque transmitting device having a member which is displaced by a servo in relation to the volume of fluid directed to an apply chamber thereof. It is expected that various other modifications to the illustrated embodiment will occur to those skilled in the art as well. For example, the fluid restriction circuit 30 could be constructed to select a single high flow orifice when relatively low stroke times are required instead of the parallel combination of two low flow orifices. Moreover, some applications requiring a relatively wide range of stroke times may necessitate the use of a third selectively activated orifice in the orifice network. In view of the above, it should be understood that controls incorporating any such modifications may fall within the scope of the present invention, which is defined by the appended claims.

The embodiments of the invention in which an exclusive property or privilege is claimed are defined as follows:

1. A control system for controlling the supply of fluid to a servo chamber of predetermined volume which is filled to engage a fluid operated torque transmitting device, said control system comprising;
   a source of fluid pressure;
   pressure regulating means for regulating the pressure of said source of fluid pressure in accordance with a pressure command;
   fluid restriction means including variable flow orifice means connecting said source of fluid pressure to said chamber, and electromagnetic means for adjusting the flow of said orifice means in accordance with a restriction command; and
   control means for issuing a combination of pressure and restriction commands for filling the predetermined volume in a desired time, thereby to control an engagement rate of said torque transmitting device.

2. The control system set forth in claim 1, wherein: said fluid restriction means includes a first orifice connecting said source of fluid pressure to said chamber and a second orifice selectively connectable in parallel with said first orifice by said electromagnetic valve.

3. A motor vehicle transmission control system for controlling the supply of fluid to a servo chamber of predetermined volume which is filled to engage a fluid operated torque transmitting device, said control system comprising;

a source of fluid pressure;

pressure regulating means adapted to regulate the pressure of said source of fluid pressure over a predetermined pressure range in accordance with a pressure command;

fluid restriction means including at least two alternate fluid circuits, and an electrically activated valve adapted to connect one of said fluid circuits between said fluid pressure source and said chamber;

selecting means for selecting a fluid circuit and a fluid supply pressure within said predetermined pressure range which will achieve a desired engagement time of said torque transmitting device; and means effective when it is desired to engage said torque transmitting device to issue a pressure command in accordance with said fluid supply pressure and to activate said valve in accordance with said selected fluid circuit.

4. The control system set forth in claim 3, including a first alternate fluid circuit defined by a first orifice, and a second alternate fluid circuit defined by said first orifice and a second orifice connected in parallel with said first orifice.

5. The control system set forth in claim 3, wherein said desired engagement time varies as a function of a certain vehicle parameter, and the selecting means selects said fluid circuit and said fluid supply pressure in accordance with a measure of said certain parameter.

6. The control system set forth in claim 5, wherein said certain vehicle parameter is measured in relation to an output speed of said transmission.

7. A control system for an automatic shift motor vehicle transmission including a servo chamber of predetermined volume which is filled to engage a fluid operated torque transmitting device, said control system comprising;

a source of fluid pressure;

pressure regulating means for regulating the pressure of said source of fluid pressure in accordance with a pressure command;

first control means effective in nonshifting modes of operation for developing a pressure command for said pressure regulating means in accordance with specified operating parameters of said transmission;

fluid restriction means including variable flow orifice means connecting said source of fluid pressure to said chamber, and electromagnetic means for adjusting the flow of said orifice means in accordance with a restriction command; and second control means effective in shifting modes of operation where it is desired to engage said torque transmitting device for developing a combination of pressure and restriction commands for filling the predetermined volume of said servo chamber in a desired time, thereby to control an engagement rate of said torque transmitting device.

* * * * *